Nov. 2, 1937.  A. L. JOHNSON  2,097,949
BUMPER JACK
Filed Sept. 1, 1936
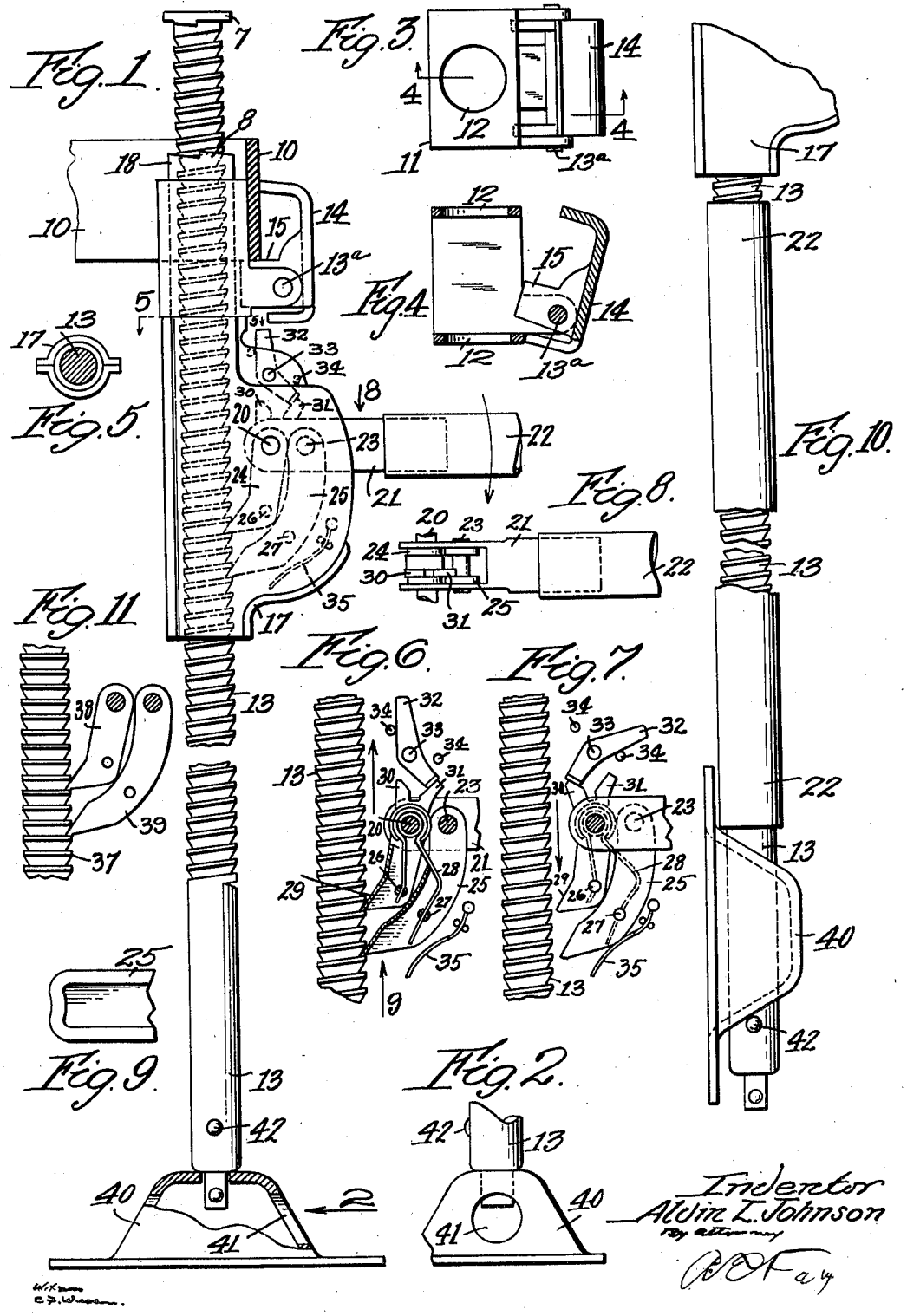

Patented Nov. 2, 1937

2,097,949

UNITED STATES PATENT OFFICE 2,097,949

BUMPER JACK

Alvin L. Johnson, Toledo, Ohio, assignor to The Logan Gear Company, Toledo, Ohio, a corporation of Ohio Application September 1, 1936, Serial No. 98,911

9 Claims. (Cl. 254—111)

This invention relates to an automobile jack. The principal objects of the invention are to provide a jack suitable for lifting an automobile by its bumper or the bumper rack bar; to provide a jack comprising a supporting rod, having a series of equally spaced screw threads around but continuous, commonly known as Whitworth buttress or ratchet threads, undercut at the bottom to make a land or shoulder for receiving the pawls but angular in shape, by which the pawl mechanism can act on these teeth in a convenient way, said pawls being shaped angular on their face; to provide means for connecting the jack housing to the bumper bar, there being an automatic bracket or clamp attached to the housing which moves with the housing as the pawl mechanism moves up or down; to provide a jack of this character in which its operating handle and base can be slipped over said shaft to protect it for packing, storing, and in transportation, with very few projections extending therefrom, and to provide an improved pawl mechanism.

Other objects and advantages of the invention will appear hereinafter.

Reference is to be had to the accompanying drawing, in which

Fig. 1 is a side view of a preferred embodiment of this jack, shown in a position lifting the car by its bumpers;

Fig. 2 is an end view of the base of the jack looking in the direction of the arrow 2 in Fig. 1;

Fig. 3 is a plan of the top member of the jack;

Fig. 4 is a sectional view on the line 4—4 of Fig. 3;

Fig. 5 is a sectional view on the line 5—5 of Fig. 1;

Fig. 6 is a side view of the pawl motion, shown partly in section, and illustrating the position of the pawls when the bumper is being moved up;

Fig. 7 is a similar view showing the position when the pawl motion is being moved down;

Fig. 8 is a plan of the operating handle and its connected parts looking in the direction of the arrow 8 in Fig. 1;

Fig. 9 is a bottom plan view of the lower pawl as indicated by the arrow 9 in Fig. 6;

Fig. 10 is a side view of the jack dismounted and remounted so that the whole jack can be carried about as a single element in the form of a rod with very few parts projecting from it, and Fig. 11 is a view similar to Fig. 6 of a modified form.

This jack is designed, as has been stated, for the lifting of an automobile by its bumper bar but of course it is capable of use for any other purpose in which we have an article to be lifted that has a vertical wall through which the lifting can take place. It will be understood that the bumper bar is supported by springs on the car so that it moves up very easily at first until the weight of the car is supported by the bumper bar. In the present case the bumper bar 10 has a vertical end which is received by a box-like member 11 having two holes 12 through it for receiving the supporting rod 13. The rod passes through this member and materially above it and has a head 7 at the top constituting a stop. This head 7 has a tooth which engages with a tooth 8 on a tube 18. Thus if the bar 10 is rotated while the pawls are engaged in the teeth they can still swing out. At the bottom of this member 11 is a pivot pin 13ª projecting out from it. On this pin is pivoted a clamp bar 14 which has an operating end 15 that is moved downwardly when this member comes up to the position shown in Fig. 1 from the position shown in Fig. 4. The weight acting on this end 15 through the bumper bar clamps the bumper bar by the swinging of the clamp bar 14.

Although the holes 12 are stated as receiving the rods 13 there is a tube 18 surrounding the rod 13 and having a tooth 8 at the top for limiting its rise against a stop 7 also having a tooth. The tube 18 engages the rod 13 and also fits in the holes 12 thus preventing tipping of the member 11. A housing 17, which supports the tube 18, is guided on the rod 13 and is provided with a pivot pin 20 on which is pivoted an operating lever 21 on which is mounted a tubular handle 22 which operates the device.

The lever 21 is also provided with a pivot 23. On the pivot 20 is an upper pawl 24 and on the pivot 23 is a lower pawl 25. These pawls are made of sheet metal and each one has a pin 26 and 27 through which passes a wire spring 28 which is provided with a circular portion surrounding pivot pin 20. At this point, as shown in Fig. 6, the trip lever 32 is flexing the spring and thereby urging both pawls against the rod 13, so that by moving the handle 22 up and down, pump fashion, the pawls will go up the rod 13 step by step.

The pawl 24 is provided with an end 29 which is slanted outwardly and has a bottom surface on the same plane as the top of one of the teeth of the rod 13. This pawl 24 also has two upward projections 30 and 31. A trip lever 32 is pivoted at 33 and moves between two stops 34. When it is in the position shown in Fig. 6, it engages the projection 31 of the spring yoke and through spring 28 forces the pawl against the rod 13 and its teeth, as shown in Fig. 6. At that time the spring 28 pulls the pawl 25 also toward the teeth. This pawl 25 has a slanting end with a bottom surface engaging the tops of the teeth of the rod 13. Like the pawl 24, it is of sheet metal and hollow but open at the back.

There is a spring 35 which, when the trip lever 32 is moved to the opposite position as shown in Fig. 7, backs up the pawl 25 so that it will not move far from the teeth. It will be noted that the engagement of the projection 30 by the trip lever, as shown in Fig. 7, moves both pawls back away from the teeth for moving downward of the whole housing 17 by oscillation of the handle. With the trip lever 32 as shown in Fig. 7 the pawl spring 28, which is one continuous spring pivoting around the pin 20 and nesting in the spring yoke having the projections 30, 31, is flexed, as at this point the trip lever 32 is in contact with projection 30 of the spring yoke thereby urging the spring and both pawls away from the shaft 13, so that when the handle 22 is moved up and down, pump fashion, the long pawl 25 will land on the spring 35 and be guided into its proper tooth on the shaft. The small pawl then comes away from the shaft 13 being urged away by the spring 28 and in turn is guided into its proper tooth by the face of large pawl 25, and moving handle 22 up and down, pump fashion, as shown in Fig. 7, the pawls and housing coming down the rod 13 step by step.

The rod 13 is screw threaded and it is provided with substantially circular teeth, each one extending around the bar but in an inclined plane. The pawls are also shaped to fit this inclined plane. The invention can be carried out with these teeth 37 horizontal and circular as shown in Fig. 11. In this form the pawls 38 and 39 are exactly the same as in the other form except for the shape of the ends of the pawls which engage the teeth. There is a slight modification as the bottoms of the pawls are horizontal.

It will be seen that, in order to operate this jack, the housing is drawn down to a point near the bottom and the jack is located just in front of the bumper bar, or it could be just back of it. Thus the bumper bar is in a position over the top of the space between the body of the member 11 and the clamp bar 14. The member 14 at that time is in the open position shown in Figs. 3 and 4. This leaves the above mentioned space. The trip lever is placed in the position shown in Fig. 6 and the handle operated. When the housing is raised by this means to the position shown in Fig. 1 the bumper bar has engaged the projection 15 and swung the member 14 around to clamp the bumper bar. From this time on the raising of the housing raises the bumper bar. It will be remembered that on account of the resilient support of the bumper bar this action will be very easy for a while but finally the bumper bar will be raised so far that the wheels of the car will be off the ground. Then it is raised enough more to clear the wheels well from the ground.

After the work has been done on the car, or the wheels thereof, the trip lever 32 is changed to the position shown in Fig. 7. The bumper bar with the car is free now to descend by the oscillation of the handle 22 from the horizontal to a downwardly inclined position.

If the trip lever 32 is moved to bring the pawl 25 into engagement with the rod 13 the car can be lowered until the wheels strike the ground by the reciprocation of the handle 22.

It will be seen therefore that this constitutes a simple and inexpensive method of lifting an automobile, bus, truck, or the like, with a single immovable rod supporting the bumper. The parts are very few and the cost of manufacture is reduced because a rod such as shown in Fig. 1 or Fig. 11 can be made more cheaply than by milling or cutting ratchet teeth across the face of a round or square bar to make a rack.

Another advantage of this invention is shown in Fig. 10. In that case the base 40, which is made of sheet metal, is provided with holes 41 so that it can be placed on the lower part of the rod 13 which is without teeth. To do this a spring pressed pin 42 yields. The handle 22 is placed on the rod before that so that rod and handle take up very little space. The housing 17 is left on the rod above the handle together with the member 11. Thus the parts can be packed into a very small space and transported in an automobile very easily. Furthermore, if they are packed in this way they do not become separated and thereby the entire jack ruined by the loss of one of the parts.

Having thus described my invention and the advantages thereof, I do not wish to be limited to the details herein disclosed, otherwise than as set forth in the claims, but what I claim is:

1. As an article of manufacture, a jack having a vertical rod provided with teeth, a pawl motion, a housing for the pawl motion, by which pawl motion the housing can be supported on the rod, a member surrounding the rod and a pivoted clamp bar associated with said member for clamping the bumper of an automobile.

2. The combination with a jack comprising a vertical rod, of a perforated hollow member thereon and surrounding the rod, a clamping member pivoted thereto, a tube fitting the rod and the perforations and an arm on said clamping member in position to force the clamping member to engage and clamp the bumper of an automobile when said bumper engages said arm.

3. In a bumper jack, the combination of a toothed rod, a movable housing surrounding the rod, two pawls in the housing for engaging the teeth, a pivoted handle for operating the lower pawl, a hollow member supported at the top of the housing, through which member the rod passes, a clamping member pivoted to the hollow member and having means by which, when said means engages the said bumper, the clamping member will move to clamp the bumper to the hollow member.

4. In a jack, the combination of a main vertical rod provided with teeth, a housing vertically movable on said rod, a pin carried inside the housing, a handle lever pivoted on said pin, and a pawl depending from and pivoted on said pin, a lower pawl pivoted on and depending from said lever, said pawls being of sheet metal and hollow but open at the front and having substantially horizontal lower edges in the same plane as the tops of said teeth, and a spring member surrounding said pivot pin and connected to both of said pawls.

5. In a pawl motion a toothed rod, a movable housing thereon, a pin carried by the housing, a pawl pivotally depending from the pin, a handle lever pivoted on said pin, a lower pawl pivotally depending from said lever, a bent spring surrounding said pin and having two branches, a pin on each pawl for receiving each branch, and yielding means for pushing the lower pawl toward the toothed rod when necessary.

6. A bumper jack comprising a straight rod provided with a plurality of teeth thereon, a handle for operating the jack of such size as to be adapted to be placed over the rod to surround it for storing purposes, a base for supporting the rod when it is used for lifting purposes, said base having a passage through it the size of the bottom of the rod, whereby the base can be placed on the rod and the parts assembled for shipment and the like.

7. In a jack, the combination with a base having a horizontal passage therethrough, and a vertical slot in the top, of a rod adapted to be passed through said passage and having teeth spaced apart therealong and having a projected end which enters the slot in the top of the base, a housing surrounding the rod, a removable hollow handle for operating the jack which can be located along the rod when the base is removed, and means whereby the base can be removed from the rod, whereby the rod can be passed through the passages through the base for transportation and storage of the jack in a small place.

8. The combination with a jack comprising a vertical toothed rod, of a hollow member thereon having top and bottom perforations for receiving said rod, a clamping member pivoted thereto at a distance beyond it, and an arm on said clamping member in position to force the clamping member to engage and clamp the outer vertical side of a bumper of an automobile when said bumper engages said arm.

9. As an article of manufacture, a rod provided with teeth; a housing surrounding said rod; a plurality of pawls in said housing adapted to engage the teeth of said rod; a pivoted manipulating member carried by said housing for moving said pawls to cause relative movement between said housing and said rod; a pin carried by said housing serving as a common pivot for one of said pawls and said manipulating member; a spring member co-acting with said pawls surrounding said pin; and a trip lever carried by said housing and adapted to change the position of said pawls and spring member with respect to said rod.

ALVIN L. JOHNSON.